United States Patent [19]

Tong et al.

[11] Patent Number: 5,150,367
[45] Date of Patent: Sep. 22, 1992

[54] COMPOSITE RANGE CONSTRAINT PROPAGATION CONTROL

[75] Inventors: David W. Tong, Scotia; Kevin C. Zalondek; Christopher H. Jolly, both of Schenectady, all of N.Y.

[73] Assignee: General Electric Company, Schenectady, N.Y.

[21] Appl. No.: 487,515

[22] Filed: Mar. 2, 1990

[51] Int. Cl.⁵ .............................................. G06F 11/00
[52] U.S. Cl. ..................................... 371/23; 371/15.1; 364/153
[58] Field of Search ....................... 371/23, 15.1, 25.1; 364/200, 153, 578

[56] References Cited

U.S. PATENT DOCUMENTS

| | | | |
|---|---|---|---|
| 4,766,595 | 8/1988 | Gollomp | 371/23 |
| 4,862,399 | 8/1989 | Freeman | 371/23 X |
| 4,875,184 | 10/1989 | Yamakawa | 364/602 X |
| 4,965,758 | 10/1990 | Sherman | 371/23 X |
| 4,972,415 | 11/1990 | Walter et al. | 371/36 |
| 5,012,430 | 4/1991 | Sakurai | 364/131 X |

OTHER PUBLICATIONS

Cantone et al., "IN-ATE TM : Fault Diagnosis as Expert System Guided Search", paper to appear in Computer Expert Systems, L. Bole and M. J. Coombs (eds.), Springer-Verlag, Heidelberg, 1987.

Pipitone, "The FIS Electronics Troubleshooting System", Computer 19 (1986) pp. 120-128.

Ben-Bassat et al., "AI-Test A Real Life Expert System for Electronic Trouble-Shooting (A Description and a Case Study)." Proceedings of the Fourth Conference on Artificial Intelligence Applications, San Diego, 1987, pp. 2-10.

de Kleer et al., "Diagnosing Multiple Faults", Artificial Intelligence, 32 (1987) 97-130.

Tong et al., "Diagnosing An Analog Feedback System Using Model-Based Reasoning", to appear in Proceeding of the 1989 AI Systems in Government Conference, Washington, D.C.

Sussman et al., "Constraints—A Language for Expressing Almost-Hierarchical Descriptions", Artificial Intelligence, vol. 14, (1980) pp. 1-39.

Primary Examiner—Jerry Smith
Assistant Examiner—Allen M. Lo
Attorney, Agent, or Firm—Gene Bolmarcich; James C. Davis, Jr.; Paul R. Webb, II

[57] ABSTRACT

A method and apparatus for constraint propagation control including determining whether more than one range is to be propagated through a selected component, propagating the one range if only one range is to be propagated, and propagated a composite range if more than one range is to be propagated and if the ranges are sufficiently identical.

5 Claims, 5 Drawing Sheets

COMPOSITE RANGE CONSTRAINT PROPAGATION CONTROL

The present invention relates to isolating defective and/or improperly operating components in a system, and more specifically, relates to automated diagnosis to isolate faulty components.

RELATED APPLICATIONS

The present application is related to copending commonly assigned U.S. patent application Ser. Nos. 07/489,120 (filed Mar. 5, 1990), 07/487,083 (filed Mar. 2, 1990), and 07/395,826 (filed Aug. 18, 1989), respectively, entitled Constraint Propagation Control, Minimal Intersection Identification/Wide Range Suppression Constraint Propagation Control, and Method and Apparatus For Generation of Multi-Branched Diagnostic Trees.

BACKGROUND OF THE INVENTION

Fault isolation, as used herein, refers to a process for identifying a faulty component or components of a system which is not operating in accordance with predetermined operating parameters. The fault isolation process generally begins at detection of abnormal system behavior and proceeds to identification of a "faulty", i.e. defective and/or improperly operating, component and/or components. With complex equipment, such as electronic control circuits, the fault isolation process requires expert knowledge of the equipment and is a time-consuming and difficult task.

To facilitate fault isolation, paper-based maintenance and troubleshooting instructions, such as service manuals, generally are utilized. For complicated systems, however, the service manuals are voluminous, require a great amount of time to generate, and are highly susceptible to incompleteness and errors. Further, in order to isolate a fault in a reasonable amount of time, the system user generally must have some expertise and knowledge of the system.

To improve upon fault isolation through paper-based instruction manuals, rule-based expert systems for practice on computers have been implemented. The rules, generally referred to as a knowledge base, of these expert systems embody the experience and heuristic knowledge of a human expert.

Because extracting heuristic and experiential knowledge from a human is difficult and time-consuming, systems for performing diagnosis based on more fundamental knowledge, i.e., knowledge that could be available from the system designer or from design documentation, have been implemented. Such fundamental knowledge is often embodied in a software model, sometimes referred to herein as a model, representation of the system. For example, an electric circuit is often represented by a circuit schematic or higher level block diagrams. The model contains functions of system components, functionality of the components, and connections between the components. Systems for developing conclusions, i.e. deductions, based upon a descriptive model for purposes such as diagnosis are often referred to as model-based reasoning systems. Model-based reasoning systems are more "automated" than rule-based expert systems because model-based systems eliminate utilization of experiential knowledge. Rather, model-based systems use generic, reusable, diagnostic information and procedures.

Known models used in model-based diagnosis systems can be categorized into two categories, namely "connectivity" models and "connectivity and functional" models. A connectivity model, sometimes referred to herein as a connectivity-only model, comprises nodes and directed connections. Each node represents a component of the system being diagnosed and directed connections indicate the structural formation, i.e. the connectivity, of the system components. In the connectivity model, only the structure of the system is modelled. The actual operation, i.e. the function, performed by each system component is not modelled or utilized. Therefore, the nominal values of system variables for a specific test condition are predetermined by some other simulation method.

With the connectivity model, the system variables can only be represented qualitatively as being "GOOD" or "BAD". That is, the actual operating value of a system variable is either equal to (GOOD) or not equal to (BAD) the predetermined nominal value of the variable. A model-based diagnostic system based upon a connectivity model thus makes deductions only with qualitative information. Although the connectivity model used in some model-based diagnosis procedures may be satisfactory to identify faulty components in simple systems, the connectivity model generally inhibits accurate fault isolation in more complex systems, especially those having feedback loops. For example, if one component in a feedback loop is indicated as being "BAD", diagnosis with the connectivity model can only indicate that the entire feedback loop is "BAD" and further isolation of a faulty component with the connectivity model is impossible.

"Connectivity and functional" models, on the other hand, allow functional behavior of system components to be expressed in specific numerical, i.e. quantitative, terms or in qualitative terms. Model-based reasoning systems, when using quantitative models, can make use of quantitative measurement information and thus generally provide more accurate diagnosis than qualitative methods. The quantitative results are specific numerical values for each terminal, such as 5.01 V, as opposed to qualitative values, such as BAD.

With connectivity and functional software models, the system to be diagnosed is modelled by using both the quantitative transfer function of each component and the connectivity of the systems components. Therefore, with the connectivity and functional model, extensive calculations must be performed, especially when complex system components having complicated transfer functions are represented in the model. Although fault isolation with connectivity and functional models is very accurate, the time period required to complete the fault isolation process utilizing this model can preclude real-time diagnostic operations.

Model-based diagnostic systems also generally include a deductive mechanism, such as a constraint propagation mechanism, which forms predictions or estimations as to values of system variables at terminals of each system component represented in the model. For example, in one embodiment of a constraint propagation mechanism, propagation, sometimes referred to as numeric constraint propagation, occurs when all but one terminal of a component has a measured or deduced value. A value is determined for the one terminal by propagation, i.e. execution of the transfer function of the system component from the other terminal values. Reference to inputs and outputs of a component is not important, or even utilized, by the propagation mechanism. Specifically, terminal values for system component outputs can be determined from component inputs, i.e. forward propagation, and component inputs can be determined from component outputs, i.e., reverse propagation, by manipulating the transfer function of the component. Other embodiments of constraint propagation mechanisms are also known, such as propagation mechanisms which allow propagation when two terminals of a component do not have values. With this mechanism, a symbol is assigned to one of the terminals without value and a symbolic expression is determined for the other terminal without value. Such propagation is sometimes referred to as symbolic constraint propagation.

Each value propagated by the propagation mechanism through each system component depends on the proper operation of a set of components, and each set of dependencies is recorded using a mechanism sometimes referred to herein as a dependency tracking mechanism. When an inconsistency occurs between a propagated value, i.e. a value predicted by the propagation mechanism, and an actual measured value at a terminal, or between two propagated values at a terminal, a conflict is recorded. The set of components involved in the conflict, i.e. the conflict set, is identified from the sets of components from which each propagated value depends. If the propagated and/or measured values at a terminal concur, no conclusions are drawn. Specifically, the dependent components from which concurring values depend cannot be assumed to be fault-free since a true fault may not be evidenced by one particular measurement.

Fault isolation also often requires a best measurement selection mechanism. This selection mechanism identifies the next best measurement to perform for efficient fault isolation. Specifically, the measurement selection mechanism instructs, through an interface, a system user to make a measurement at a selected terminal in order to further isolate the faulty component. The system user enters a measured value of the selected terminal, and then this measured value is utilized for another sequence of propagation through the model by the propagation mechanism.

As propagation and measurement continues, a number of conflict sets will be outstanding from which fault candidates can be derived. A fault candidate comprises a set of components which includes at least one component from each conflict set. The failure of all components of a fault candidate is a valid explanation for all the measurement results. A "single fault" candidate is a component common to all conflict sets. A "multiple fault" candidate contains components not included in all conflict sets. As propagation is repeated, the actual fault is more isolated and eventually identified so that the appropriate system component can be replaced or repaired.

Although the connectivity and functional models provide accurate results, the amount of time and computing resources required to propagate through the model may prohibit use of the system. Specifically, a fault may have to be identified quickly in order to replace the faulty component and restore operation. Propagating a plurality of values and/or ranges of values through the model, however, may preclude timely fault isolation.

It is therefore an object of the present invention to provide an automated fault isolation method and apparatus which reduce the amount of time required to isolate a fault.

SUMMARY OF THE INVENTION

The present invention is utilized when ranges propagated to a terminal are sufficiently identical. The sufficient identity of the ranges may be determined in accordance with one of many methods. If the ranges are sufficiently identical, then a composite range is propagated through the terminal. The composite range may, for example, be one of the ranges propagated to the terminal or may be a union of the ranges. In any event, the dependency set of each range propagated to the terminal is not joined, i.e., unioned, with the dependency sets of the other ranges.

By propagating only one of the ranges through the terminal when the ranges are sufficiently identical, a savings in time results. Specifically, the time require to perform constraint propagation is reduced. This reduction in time leads to more timely identification of a faulty component and/or components.

BRIEF DESCRIPTION OF THE DRAWINGS

These and other objects of the present invention, together with further features and advantages thereof, will become apparent from the following detailed specification when read together with the accompanying drawings, in which.

DETAILED DESCRIPTION OF THE DRAWINGS

Figure 1:
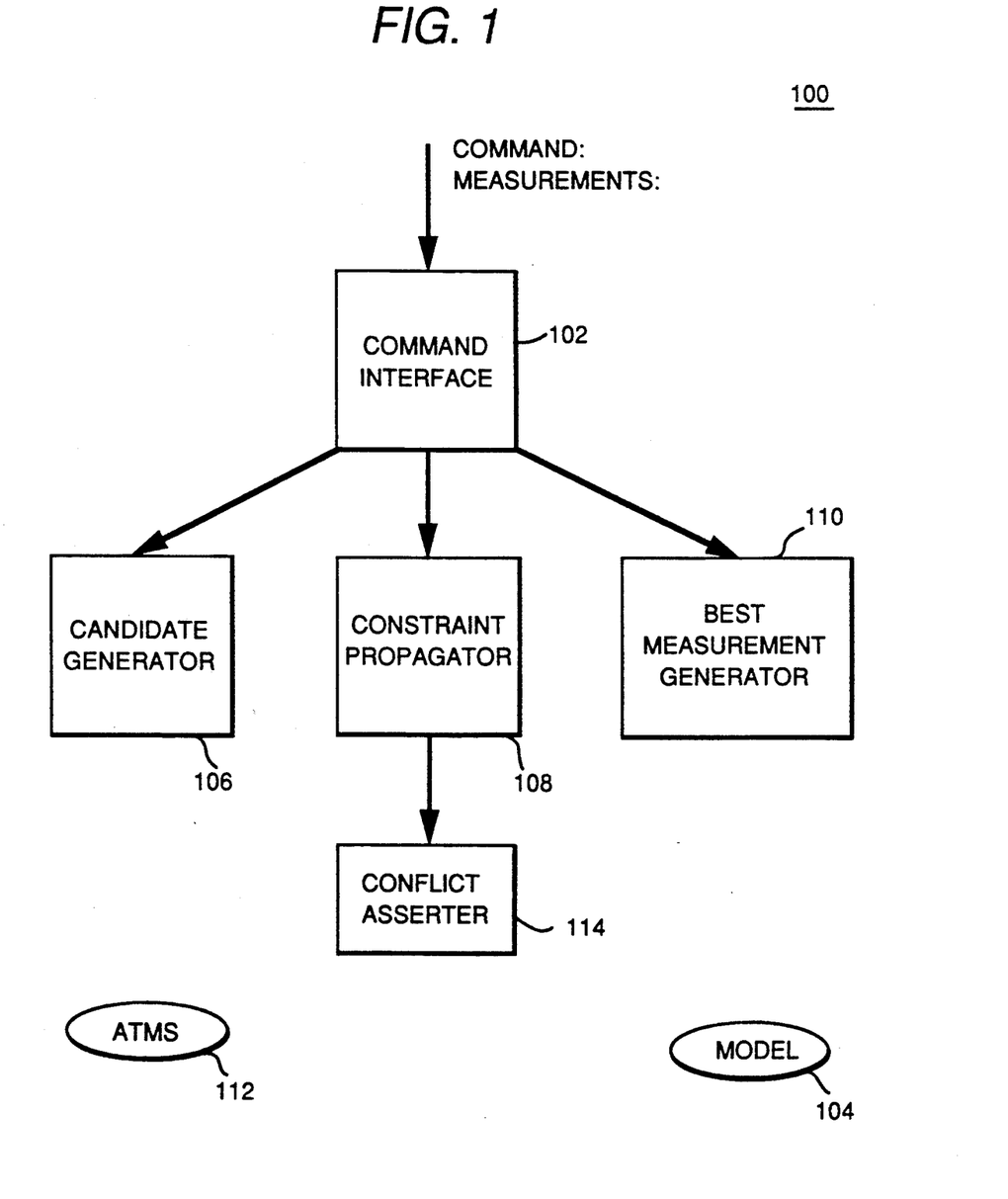
FIG. 1 is a system diagram of a model-based system for fault isolation.

A model-based diagnostic system 100 as shown in FIG. 1 typically includes a command interface 102 through which a system user enters commands. The user may also enter and edit information, through the interface, for generation of a model 104 for a system to be diagnosed. The system user generally enters commands to perform propagation, candidate generation, and best measurement selection as hereinafter described. The diagnostic system also includes a conflict generator 106 which generates conflict sets and a constraint propagator 108 to deduce terminal values. The diagnostic system further includes a best measurement generator 110 to determine a measurement within the system being diagnosed which, if performed, would provide the most information towards isolating a fault or, equivalently, results in the fewest measurements required to isolate the fault. A dependency tracking system 112 is used to record, i.e. track, dependencies of system components. The dependency tracker is illustrated in FIG. 1 as an assumption-based truth maintenance system ATMS but may be implemented in other ways. A conflict asserter 114 determines inconsistencies between predicted values generated by the constraint propagator and actual measured values, and communicates identified inconsistencies to the ATMS which identifies the conflict sets associated with these inconsistencies.

Figure 2:
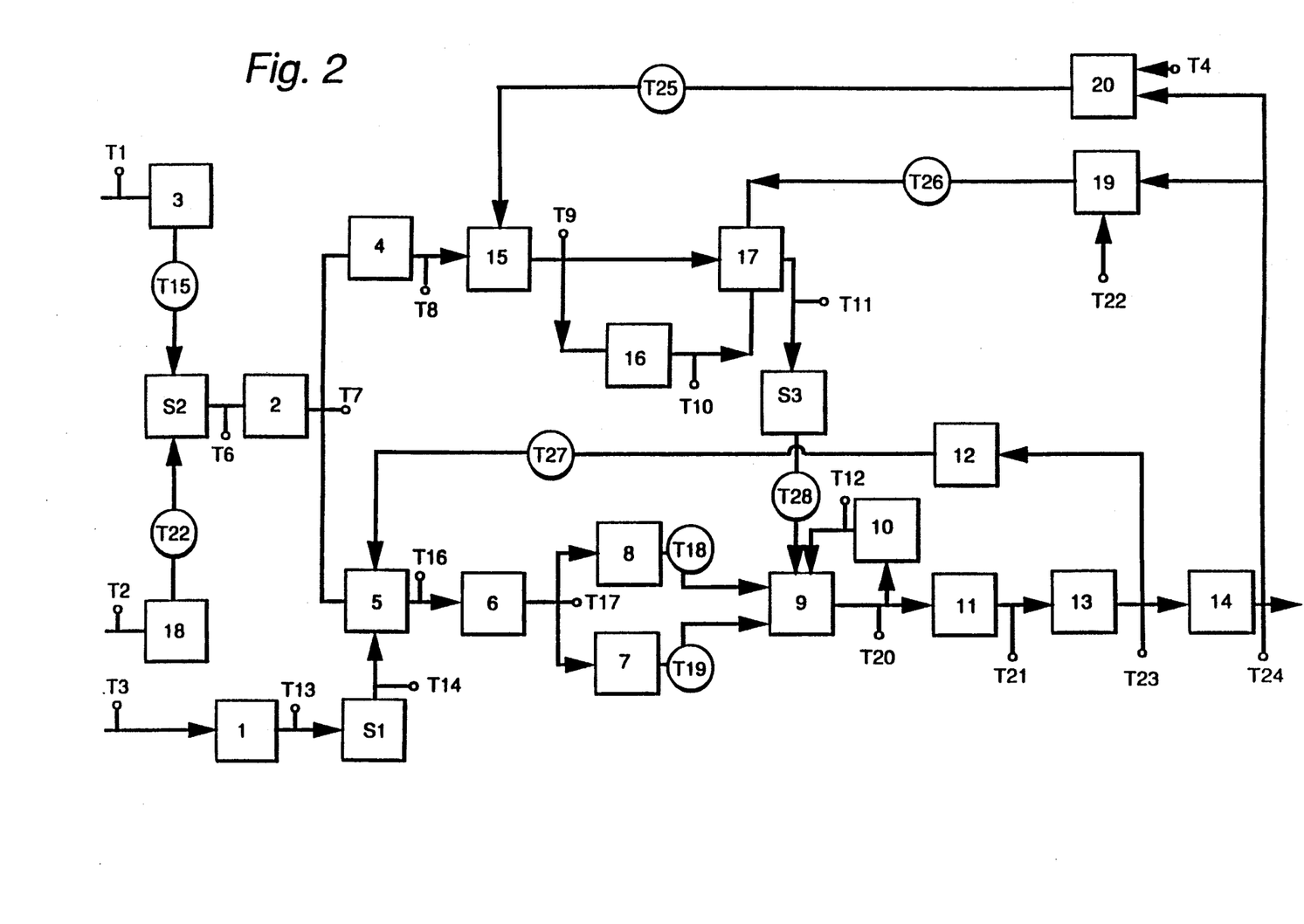
FIG. 2 is block diagram of a feedback control system.

Model 104 of the system to be diagnosed is stored in a block of memory locations in the computer. The model generally is manually generated by a system engineer who enters the connectivity and the transfer functions of each system component through interface 102 of system 100. Inputs and outputs of each component of a system to be diagnosed are represented as terminals. FIG. 2 illustrates an example of a model 120 of a system to be diagnosed. Terminals T1-T29 in the model and each component 1-20 are represented as a block. Importantly, although directionality is indicated in FIG. 2 by arrows, i.e. inputs and outputs, directionality in the model is not necessary for operation of the propagation mechanism. For example, terminal value information can be propagated from input-to-output, i.e., forward propagation, or output-to-input, i.e., reverse propagation, of each component.

The system shown in FIG. 2 is an analog circuit having multiple coupled feedback loops, having on the order of one-hundred base-level components. Most of the components are electronic but some are electromechanical in nature. For example, an output variable at terminal T24 is velocity and primary inputs at terminals T1 and T2 are electrical signals. Auxiliary inputs to the system at terminals T3, T4 and T5 include a velocity sensor, a fluid pressure sensor for a hydraulic drive, and a drag sensor, respectively. In the model illustrated in FIG. 2, the level of fault isolation need only be to the level represented by each block.

Each block in FIG. 2 represents a specific function such as a demodulator, and each block has a number therein, i.e. 1-20. The system also includes a plurality of switches S1-S3. Transfer functions for most of the blocks are derived from an idealized detailed schematic. For example, the transfer function for a simple amplifier is a linear gain with upper and lower bounds at the operational amplifier saturation levels.

Briefly, once the model has been completed for a particular device, diagnosis of faults proceeds by using the constraint propagation mechanism to form predictions as to specific values of each terminal of the system. The propagation mechanism may, for example, be a computer-implemented process which applies the transfer function of the component to the range of values to be propagated. Propagation mechanism are well-known in the art. Inconsistencies are detected and conflict sets are identified. These steps could be very computationally intensive depending upon the complexity of the system to be diagnosed.

Each value of each terminal as predicted by the propagation mechanism generally depends on the correct operation of a set of components, and during propagation, each set of dependencies, i.e. all components whose correct operation is assumed for the deduction of a terminal value, is recorded. The sets of dependencies are maintained in the dependency tracking mechanism for each deduced terminal value. When there is a conflict at a terminal between a predicted value and a measured value, or between two propagated values, then a conflict is established. The set of components involved in the conflict, i.e. the conflict set, can be identified from the sets of dependencies of each propagated value. If the values at a terminal concur, no conclusions are drawn.

One of the most important steps in fault isolation is the identification of the next best measurement to perform after propagation of an earlier measured value for a terminal. An example of a method for determining the next best measurement is described in de Kleer et al., "Diagnosing Multiple Faults", Artificial Intelligence, 32 (1987), 97-130. Once the next best measurement has been determined, the system identifies the terminal to be measured and the system user makes the indicated measurement on the actual system. The measured value is then input to command interface 102. The propagation mechanism receives this value and then proceeds with constraint propagation through model 104 as far as possible. Conflicts are again recorded, the next best measurement is identified, and the system user is instructed to perform another selected measurement. The process is repeated until the conflict sets are reduced to specific faults, both single and multiple, thereby isolating the fault.

Figure 3:
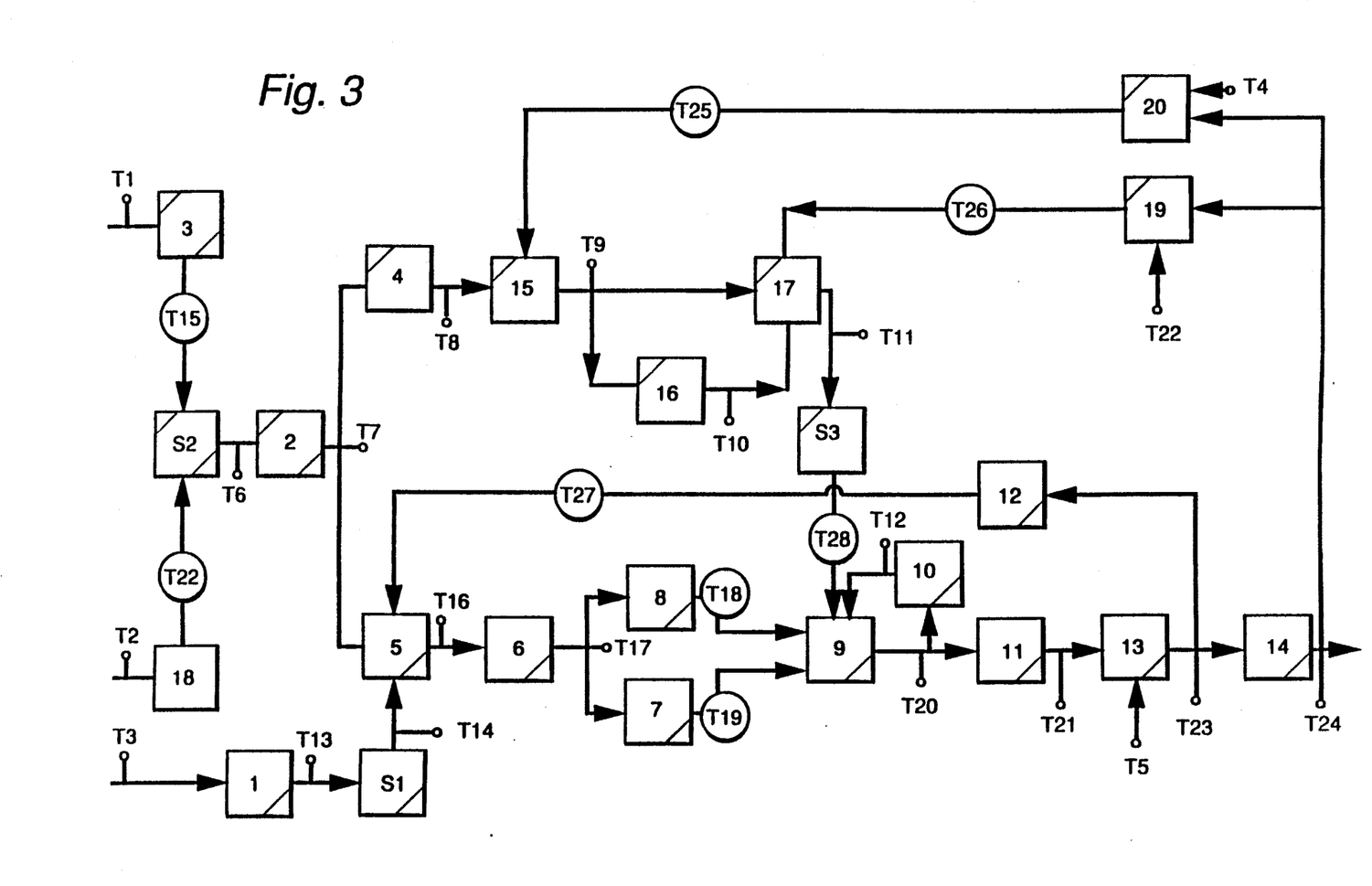
FIG. 3 is the block diagram shown in FIG. 2 and further including identified conflict sets.

As an example of fault isolation, and with reference to FIG. 2, when a non-zero value is assigned to input terminal T1 and zero is assigned to the output present at terminal T24, the system indicates a first conflict involving all system components, except for component 18 at terminal T2 which is an alternate input to the circuit model. The best measurement generator then indicates that terminal T11 is the next best measurement. This choice can be readily justified since the model includes two main feedback loops coupled through switch S3. A measurement at terminal T11 therefore effectively separates the two main feedback loops. FIG. 3 illustrates the system shown in FIG. 2, and FIG. 3 further indicates conflict sets found after a measurement at terminal T11.

Inputting a measured value of zero at terminal T11 initiates another sequence of propagation in conflict finding. After this propagation, two conflict sets are formed as indicated by the shading of each block in FIG. 3. A first conflict set is indicated by shading on the lower right corner of blocks in the first set and a second set is indicated by shading the upper left corner of blocks in the second set. As shown, three components, block 3, and switch S2, are common to both conflicts and these components are identified as single fault candidates. The next best measurement determined by the best measurement generator is terminal T6 which substantially is the midpoint of the single fault candidates. Thus, the best measurement generator isolates the highest probability candidates. That is, it is more probable that a single component is faulty rather than multiple components.

If the measured and predicted values are the same for terminals T6 and T7, then two nonoverlapping conflicts sets remain. That is, the first and second conflict sets must each contain a faulty component and the presence of multiple faults is confirmed. The propagation and measurement selection process then continues to reduce each conflict set to a single faulty component. Further detail as to the operation of such a system is described in Tong et al., "Diagnosing An Analog Feedback System Using Model-Based Reasoning", Computer Society Press Reprint (IEEE), reprinted from Proceedings of the Annula AI Systems In Government Conference, Washington, D.C., Mar. 27-31, 1989.

Figure 4:
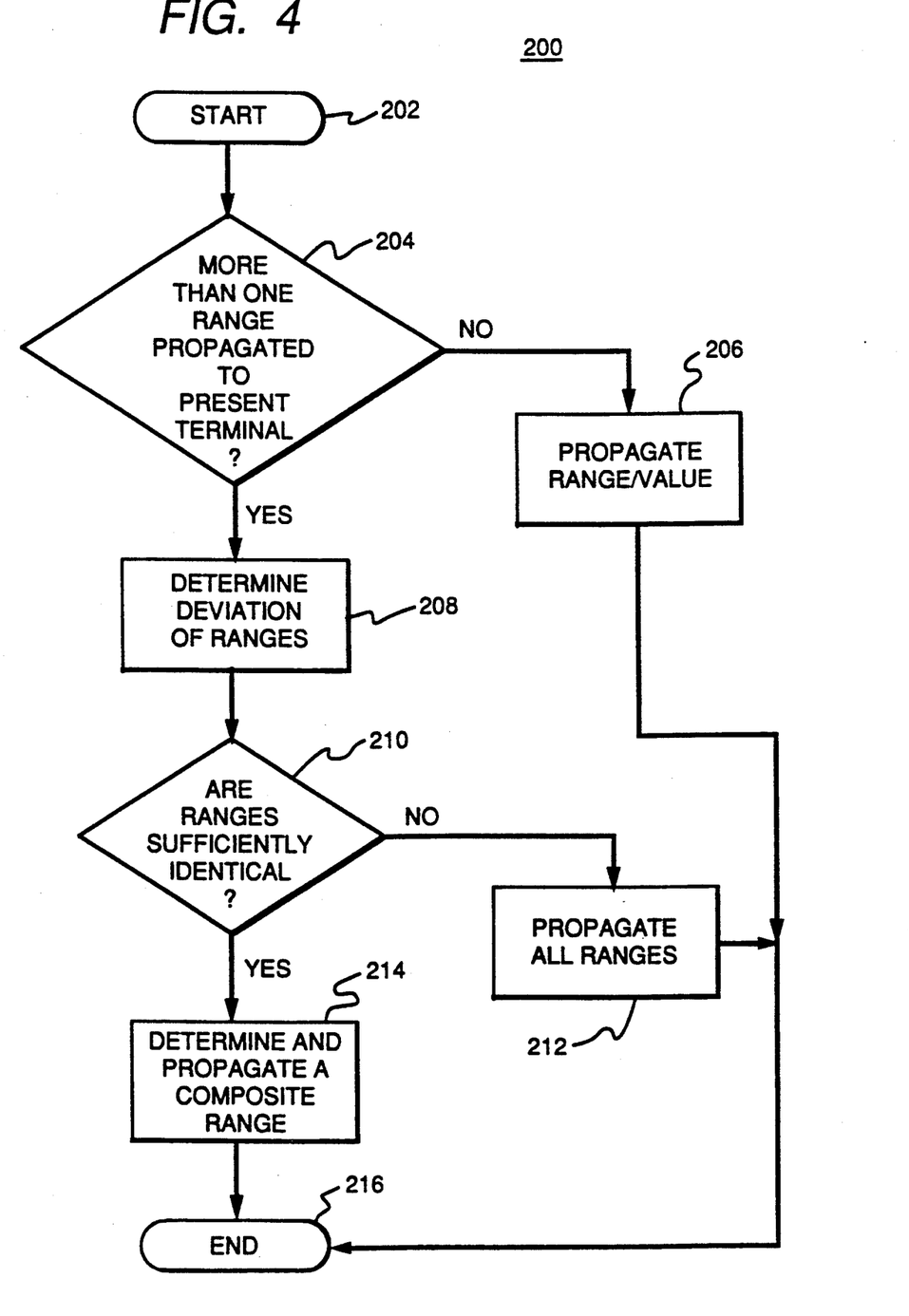
FIG. 4 is a flowchart illustrating a sequence of process steps in accordance with the present invention.

The present invention, as shown in a flow chart 200 in FIG. 4, is a "composite range" process for decreasing the amount of time required for constraint propagation. The "composite range" process illustrated in FIG. 4 is to be applied to all terminals or selected terminals during propagation. More specifically, as the constraint propagation mechanism propagates through a model, and as previously described herein, terminals are activated, usually in some sequence. After a terminal is activated, ranges propagated to the terminal are propagated through a component coupled to the terminal. In accordance with the present invention, subsequent to activation of a terminal, i.e., the present terminal, and prior to propagation through the coupled component, the sequence of process steps illustrated in FIG. 4 are performed.

Specifically, once operations have begun as indicated at a start block 202, the present system first determines whether more than one range has been propagated to a terminal presently being analyzed as indicated at a decision block 204. If only one range/value has been propagated to the selected terminal, then that range/value is propagated through the component as indicated at block 206. If more than one range has been propagated to the terminal, then a range deviation is determined as indicated at a block 208.

Figure 5:
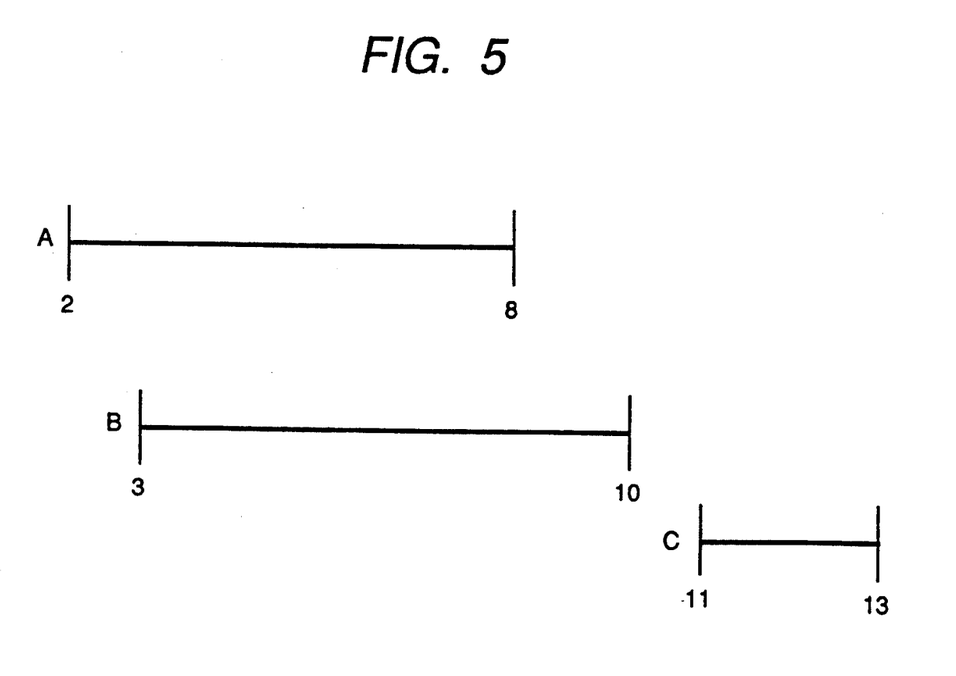
FIG. 5 illustrates a plurality of ranges propagated to a terminal.

For example, and as shown in FIG. 5, if one terminal has a range A and a range B propagated thereto, the present system compares the ranges to determine whether the ranges are sufficiently identical. Such comparison can be performed by simply subtracting the minimum range value of each range to obtain a value RMIN and subtracting the maximum range values to obtain a maximum range value RMAX. Then, in absolute values, add RMIN and RMAX to obtain a value RDEV.

If a minimum value for Range A is two (2) and a minimum value for Range B is three (3), then a resulting minimum range difference is one (1), i.e., three (3) minus two (2). If a maximum value for Range A is eight (8) and a maximum value for Range B is then (10), then a resulting maximum range difference is two (2), i.e., ten (10) minus eight (8). The range deviation would be assigned as three (3), i.e., one (1) plus two (2).

Once the difference between the ranges is determined, and as indicated at a decision block 210, the present system determines whether the ranges are sufficiently identical, i.e., within a predetermined threshold level, for composite range propagation. As indicated at a block 212, the system will propagate each range if the ranges are not sufficiently identical. As indicated at a block 214, however, if the ranges are sufficiently identical, then a fuzzy range is determined and propagated. Operations then end as indicated at an end block 216.

For example, and referring again to FIG. 5, if RDEV is equal to or less than some threshold level, such as a value of five (5), then the ranges are deemed sufficiently identical for composite range propagation. The amount of variation between two ranges which can be tolerated generally must be determined by the system user. Since the deviation, as calculated above, is three (3), a composite range would be utilized since the threshold is five (5).

The above example is for illustrative purposes only. In practice, the deviation between the ranges which can be tolerated for composite range propagation usually are small and, for example, the maximum allowable deviation may be chosen to be a function of one of the propagated ranges. For example, a deviation of five percent (5%) of the range having a smaller range span may be selected as the maximum allowable range deviation. Further, more than two ranges may undergo composite range analysis and result in propagation of one composite range.

More specifically, and referring to FIG. 5, range A has a range span of six (6), i.e., eight (8) minus two (2), and range B has a range span of seven (7), i.e., ten (10) minus three (3). Range A therefore is the minimum range span. Five percent of range A is 0.3, and therefore, 0.3 would be selected as the maximum range difference allowable for composite range propagation. Under these conditions, since the deviation of ranges A and B as previously calculated is three (3), both ranges A and B would be propagated, i.e., RDEV for ranges A and B is greater than 0.3.

Generally, if composite range propagation is to be utilized, the ranges propagated to the terminal are unioned, e.g., range A union range B, i.e., A U B, and "unioned" range is selected as the composite range. Even though the ranges may be unioned to form the composite range, the dependency sets of each range, i.e., D(A) and D(B), are kept distinct. The manner of selecting the composite range can vary, and for example, a range could be selected based on the range having the lowest minimum value, the range having the highest minimum value, a range having the highest maximum value, or a range having the lowest maximum value. Many methods for selecting a composite range are possible and contemplated.

It should be understood that a number of propagation cycles may be required to isolate a fault. For each cycle and at each activated terminal, the present method could be utilized to reduce propagation time. Further, any combination of ranges deduced at a terminal may be combined to form a composite range. The non-combined ranges, and any resulting composite ranges, would then be propagated.

By utilizing composite range propagation, the amount of time required to traverse a whole system and propagate values therethrough is reduced. This reduction in time facilitates quick identification of fault candidates and eventual identification of the faulty components and/or component.

While embodiments of the present invention have been illustrated and described herein, it will be obvious that numerous modifications, changes, variations, substitutions and equivalents, in whole or in part, will now occur to those skilled in the art without departing from the spirit and scope contemplated by the invention. Accordingly, it is intended that the invention herein be limited only by the scope of the appended claims.

What is claimed is:

1. A method for composite range constraint propagation control, a constraint propagation mechanism being utilized to implement propagation, said method comprising the steps of:
   determining whether more than one range is to be propagated through a selected component;
   propagating one range if only one range is to be propagated; and
   propagating a composite range if more than one range is to be propagated, and if the ranges are sufficiently identical, said sufficiency of identity being determined by comparing a predetermined threshold to the sum of the absolute values of a first and second value, wherein said first value is the difference between the maximum values of said ranges and said second value is the difference between the minimum values of said ranges.

2. A method for composite range constraint propagation in accordance with claim 1 wherein the predetermined threshold comprises a value obtained as a function of one or more of the ranges.

3. A computer implemented method for constraint propagation control, a constraint propagation mechanism being utilized to implement propagation through a connectivity and functional model of system components, for each component selected for propagation, said method comprising the steps of:

determining whether more than one range is to be propagated through a selected component;

propagating one range if only one range is to be propagated; and propagating a composite range if more than one range, is to be propagated, and if the ranges are sufficiently identical, said sufficiency of identity being determined by comparing a predetermined threshold to the sum of the absolute values of a first and second value, wherein said first value is the difference between the maximum values of said ranges and said second value is the difference between the minimum values of said ranges.

4. A method for constraint propagation in accordance with claim 3, wherein the predetermined threshold comprises a value obtained as a function of one or more of the ranges.

5. An apparatus for constraint propagation comprising:

means for propagating ranges of values through a component represented as a transfer function in a model;

means for propagating a composite range through the component if the ranges of values are sufficiently identical, said sufficiency of identity being determined by comparing a predetermined threshold to the sum of the absolute values of a first and second value, wherein said first value is the difference between the maximum values of said ranges and said second value is the difference between the minimum values of said ranges.

* * * * *